United States Patent [19]

Uesugi

[11] 4,241,982
[45] Dec. 30, 1980

[54] ZOOM LENS BARREL CAPABLE OF DIFFERENT DIRECTIONAL OPERATIONS

[75] Inventor: Kyozo Uesugi, Sakai, Japan

[73] Assignee: Minolta Camera Kabushiki Kaisha, Osaka, Japan

[21] Appl. No.: 84,130

[22] Filed: Oct. 12, 1979

[30] Foreign Application Priority Data

Oct. 27, 1978 [JP] Japan ................................ 53/132800

[51] Int. Cl.³ .......................... G02B 15/16; G02B 7/10
[52] U.S. Cl. ...................................... 350/187; 350/255
[58] Field of Search ................................ 350/187, 255

[56] References Cited

U.S. PATENT DOCUMENTS

| 3,277,783 | 10/1966 | Eggert ................................... | 350/187 |
| 4,171,880 | 10/1979 | Mori et al. ........................... | 350/187 |

FOREIGN PATENT DOCUMENTS

| 49-18027 | 5/1974 | Japan ...................................... | 350/187 |
| 53-82341 | 3/1978 | Japan ...................................... | 350/187 |

*Primary Examiner*—Jon W. Henry
*Attorney, Agent, or Firm*—Watson, Cole, Grindle & Watson

[57] ABSTRACT

A zoom lens barrel has first and second manually operable members movable for effecting a zooming operation in different directions. The first operable member is axially movable for effecting movement of a first lens group and is threaded with an axially movable follower member such that the first operable member and the follower member are axially moved in response to axial movement of the other. A first pin-slot arrangement interconnects the follower member and a rotatable intermediate cam ring with one another such that the cam ring is rotated in response to axial movement of the follower member while the follower member is axially moved in response to rotation of the cam ring. A second pin-slot arrangement interconnects the cam ring with a lens frame supporting a second lens group such that the second lens group is moved for zooming in response to rotation of the cam ring with a given spatial relationship with respect to the first lens group. The second operable member is rotatable together with the cam ring. An adjusting device may adjust friction between a stationary barrel and the second operating member or the cam ring, thereby preventing accidental rotation of the cam ring.

11 Claims, 6 Drawing Figures

ZOOM LENS BARREL CAPABLE OF DIFFERENT DIRECTIONAL OPERATIONS

BACKGROUND OF THE INVENTION

1. Field of the Invention

The present invention relates to a zoom lens barrel which permits zooming by both a straightforward operation along the optical axis and a rotating operation about the optical axis.

2. Description of the Prior Art

The known zoom lens barrel is either of a straightforward operation type, or a rotating operation type. The former type drives the movable optical component of a zoom lens when a zoom operating member is moved along the optical axis. This type of zoom lens barrel is capable of prompt operation from the nature of its operational direction. However, it is not suitable for fine control. In addition, a single operating member is used in this type of zoom lens barrel for both zooming and focusing. It is often constructed such that it is moved straightforward for zooming and rotated for focusing. In this case, both operations can be carried out simultaneously and promptly, but it is difficult for zooming alone to be performed with a focusing condition kept unchanged. Meanwhile, the rotating operation type of zoom lens barrel makes fine control possible through fine movements of an operational member. In addition, an operating member is normally independent of a focusing operating member, thereby permitting zooming alone with a focusing condition kept unchanged. In this case, however, prompt operation is not possible.

Disclosed by Japanese Utility Model Publication No. 49-18027 is a zoom lens barrel which obviates the disadvantages of a both operation system and which is selectively and alternatively capable of a straightforward zoom operation and a rotating zoom operation. The zoom lens barrel disclosed in this publication requires guide cam members for alternatively controlling the straightforward zoom operation and rotating zoom operation, in addition to a cam for use in zooming. Furthermore, it requires a changeover means for selection of such operations, and as a result, an operation set by the changeover means is only possible and a mechanism for operation selection is also complex.

SUMMARY OF THE INVENTION

Accordingly, the primary object of the present invention is to provide a zoom lens barrel which permits alternative selection of two different operations for operating a straightforward zoom operating member and a rotation zoom operating member in a comparatively simple mechanism. To achieve this object, the zoom lens barrel according to the present invention, is provided with a first operating member at least movable straightforward along the optical axis and whose straightforward movement shifts at least a first lens group, a following member movable along the optical axis in response to the straightforward movement of the first operating member, an intermediate member rotatable about the optical axis, a first pin-cam slot means for interlocking both the following and intermediate members so that the intermediate member may rotate in response to the movement of the following member along the optical axis, a second pin-cam slot means for interlocking a holding member for holding a second lens group and the intermediate member so that the second lens group may move in a predetermined relationship relative to the first lens group in response to the rotation of the intermediate member, and a second operating member which is rotatable integrally with the intermediate member and externally operable in order to externally and directly rotate the intermediate member. The direction of the cam slot of the first pin-cam slot means is determined so that it may satisfy dynamic conditions under which the intermediate member rotates in response to the movement of the following member along the optical axis and the following member moves along the optical axis in response to the rotation of the intermediate member.

According to the present invention, zooming is possible for a straightforward type operation by means of the first operating member and a rotating type operation by means of the second operating member, both operations being possible at any desired adjusted camera-to-object distance and focal length, and any desired operation being available only by selecting the operating members.

The above and other objects and features of the present invention will become more apparent from the following detailed description of the invention taken in conjunction with the accompanying drawings.

DETAILED DESCRIPTION OF THE PREFERRED EMBODIMENTS

Figure 1:
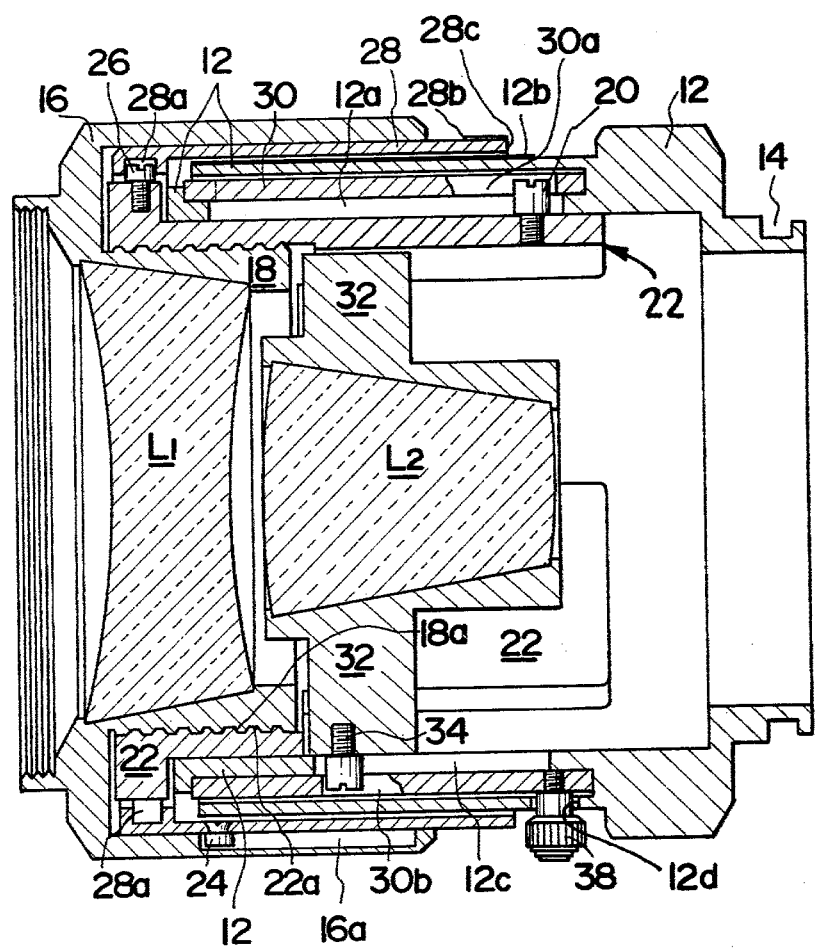
FIG. 1 is a longitudinal cross-sectional view of a first embodiment of the present invention.

With reference to FIG. 1, the zoom lens barrel according to a first embodiment of the present invention comprises a first movable lens group L1 and a second movable lens group L2, the present embodiment being applied to an exchangeable lens in a so-called two component zoom optical system in which the first movable lens group alone is moved for focusing, and the first movable lens group and the second movable lens group are moved in a given relationship relative to each other for zooming. Formed on the rear of a fixed or stationary lens barrel 12 is a mount 14 for mounting the exchangeable lens on a camera body (not shown). An operating ring or first operable member 16 is provided for effecting a straightforward zoom operation and for effecting a rotating focusing operation, and has an integral first lens holder 18 supporting first movable lens group L1. A helicoid thread 18a engages a helicoid screw 22a of a straightforward frame 22 which carries a pin 20 engageable with a straight groove 12a provided along the optical axis formed in barrel 12, frame 22 being disposed within barrel 12 and movable in a straightforward direction. A scale ring 28 carries a pin 24 engageable with a straight axial groove 16a formed in operating ring 16, and formed on scale ring 28 is a circumferential groove 28a with which a pin 26 fixed at the front end of straightforward frame 22 is engaged. A distance scale mark 28b is located at the end of the externally exposed portion of the scale ring and a set or adjusted distance is indicated by an angular relationship between mark 28b and index 12b provided on fixed barrel 12. Marked also on fixed barrel 12 is a focal length scale or a zoom ration scale, and when zooming, scale ring 28 is moved along the optical axis by means of straightforward frame 22 to indicate the focal length scale or zoom ration scale by the relative positions along the optical axis between a rear end edge 28c of scale ring 28 and the focal length scale.

A cam ring or intermediate member 30 is mounted within fixed barrel 12 such that it is incapable of a straightforward movement but is rotatable only about the optical axis. Formed on cam ring 30 is a first cam groove or slot 30a with which pin 20 carried by straightforward frame 22 is engaged after passing through straight groove 12a on fixed barrel 12, and a second cam groove or slot 30b with which pin 34 carried by a second lens holder 32 supporting second movable lens group L2 is engaged after passing through axial groove 12c on fixed barrel 12. An operating piece or second operable member 38 is provided for the rotation zoom operation and is detachably threaded into cam ring 30 after passing through circumferential groove 12d on fixed barrel 12. Operating piece 38 has cylindrical head portion and is provided with anti-slipping means (such as knurling) on its side and top surfaces. First cam groove 30a is formed such that it effects rotation of cam ring 30 when pin 20 is moved together with straightforward frame 22 along the optical axis, and effects movement of straightforward frame 22 along the optical axis when cam ring 30 is rotated by means of operating piece 38. A second cam groove or slot 30b is formed in intermediate member 30 such that second lens holder 32 is moved along the optical axis in response to the rotation of cam ring 30 at a predetermined speed rate and speed variation characteristics relative to first lens holder 18.

The lens barrel construction in FIG. 1 resembles that disclosed by a Japanese Utility Model Laid-Open Publication Sho. 53-82341, except for operating piece 38. In the FIG. 1 embodiment, however, straightforward frame 22 and cam ring 30 are required to move along the optical axis or rotate when either is driven, and this requires special dynamic conditions for a relationship between the cam groove and the pin.

Figure 2:
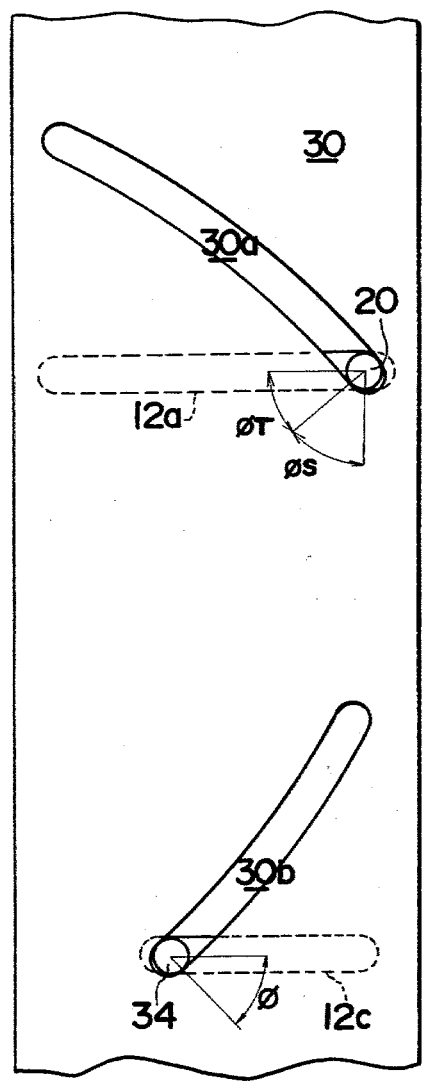
FIG. 2 is a detailed view of the cam ring of FIGS. 1 and 3.

With reference to FIG. 2, which is a detail view of cam ring 30, dynamic conditions relative to the interlocking transmission by pin 20 and cam groove 30a may require, in the case of straightforward zoom operation, a pressure angle when the movement of pin 20 along straight groove 12a on fixed barrel 12 rotates cam ring 30, i.e., an angle $\phi S$ formed by the normal of cam groove 30a and the following direction of cam ring 30, and a pressure angle when the rotation of cam ring 30 moves pin 34 along groove 12c on fixed barrel 12, i.e., angle $\phi$ formed by the normal of cam ring 30 and the following direction of pin 34, to be considered.

Moreover, during a rotation zoom operation to be considered are the pressure angles when the rotation of cam ring 30 moves pins 20 and 34, i.e., the angle $\phi$ for pin 34 and angle $\phi T$ formed by the normal direction of cam ring 30 and the following direction of pin 20 for pin 20. Generally, when converting motion by the pin and cam groove for transmission, a pressure angle not greater than 55° is suitable and not greater than 50° is more desirable. If the member forming a cam groove, material of a pin and finishing are improved so that wear or abrasion may be minimized or if the pin is made of a rotating roller, operation is possible at a pressure angle of 65° or so. Even in this case, however, a more desirable result may be obtained if the pressure angle is made not greater than 60°. Therefore, in the present embodiment, pressure angles $\phi$, $\phi S$ and $\phi T$ are all required to satisfy the respective conditions. Particularly, cam groove 30a requires two pressure angles $\phi S$ and $\phi T$ to satisfy the above conditions simultaneously. It is to be noted that such numerical values are affected by a variation rate in movable speed of movable lenses or variation characteristics, the weight of movable lenses, the construction of a lens barrel and the required durability, and such factors must be taken into consideration in actual designing. However, satisfactory operation may be expected so long as the above numerical values at least are satisfied. Furthermore, there may exist pressure angles at a plurality of places for moving one lens group, depending on the construction of a lens barrel. In this case, the above consideration is required to be given to the respective pressure angles.

In the embodiment of the present invention in which cam grooves 30a and 30b are formed so as to satisfy the above dynamic conditions and constructed as shown in FIG. 1, first lens holder 18 is advanced or retracted, upon rotation of ring 16, along the optical axis and relative to straightforward frame 22 due to the engagement between helicoid threads 18a and 22a whereby focusing is performed. At this time, scale ring 28 is rotated together with operating ring 16 via engagement between pin 24 carried and axial groove 16a, and a set camera-to-subject distance is indicated by scale mark 28b and index 12b.

When operating ring 16 is moved along the optical axis, first lens holder 18 is moved together therewith, and at the same time straightforward frame 22 (in the form of an axially movable follower) follows the movement along the optical axis because of the helicoid engagement between threads 18a and 22a. Rotation of cam ring 30 is effected by the interengagement of pin 20 and cam groove 30a and second lens holder 32 is driven along the optical axis, for effecting zooming, by the interengagement of cam groove 30b and pin 34. At this time, scale ring 28, together with straightforward frame 22, is advanced or retracted by the interengagement of circumferential groove 28a and pin 26, and a set focal length or zoom ratio is indicated by rear end edge 28c and the scale mark on fixed barrel 12.

When cam ring 30 is rotated by operating piece 38, second lens holder 32 is moved by the interengagement of cam groove 30b and pin 34, and at the same time straightforward frame 22 is driven along the optical axis by the interengagement of cam groove 30a and pin 20, and as a result, scale ring 28 and first lens holder 18 are also moved along the optical axis for zooming and zooming indication.

Figure 3:
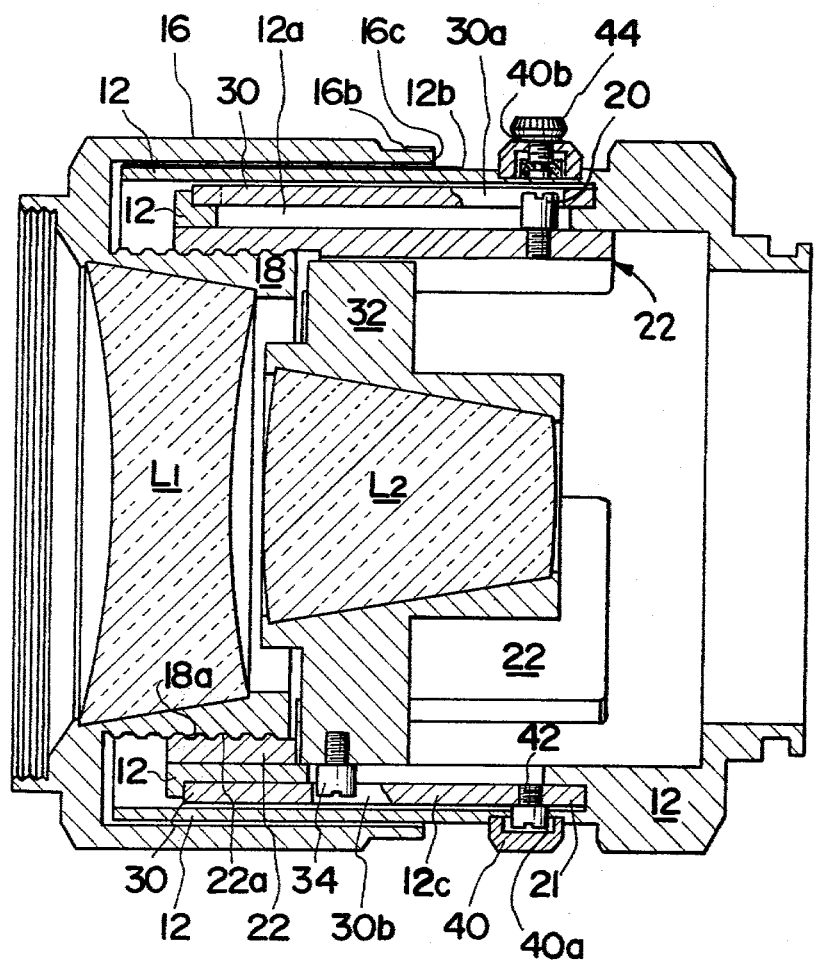
FIG. 3 is a longitudinal cross-sectional view of a second embodiment of the present invention.

FIG. 3 shows a second embodiment of the present invention in which a lens system and a lens drive mechanism are substantially identical to those of the FIG. 1 embodiment, and the same reference numerals are used for elements corresponding to FIG. 1 for the omission of explanations given to individual elements. In this embodiment, a second operating annular ring or member 40 is provided for the rotation zoom operation and engages fixed barrel 12 for relative rotation about the optical axis. A pin 42 is carried by cam ring 30 and engages a recess 40a in second operation ring 40 so as to interlock operating ring 40 and cam ring 30, and at the same time, a focal length or zoom ratio scale 40b is marked on the surface of second operating ring 40 so that zoom indication may be made by the relative rotated position to index 12b on fixed barrel 12. Moreover, the indication of a camera-to-subject distance is performed by distance scale 16b on operating ring 16 and index 12b on fixed barrel 12. Therefore, in the FIG. 3 embodiment, a scale ring is omitted thereby resulting in a simpler mechanism for indication than that shown in FIG. 1, as well as a smaller outer diameter of a lens barrel. Focusing by the rotation of operating ring 16 and zooming by the movement along the optical axis are performed in a similar manner described with reference to FIG. 1. When second operating ring 40 is rotated, cam ring 30 is rotated for zooming in a similar manner described for FIG. 1.

Figure 4:
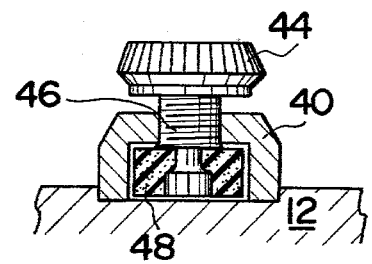
FIGS. 4 and 5 are cross-sectional views of a load control section of rotational zoom operation.
Figure 5:
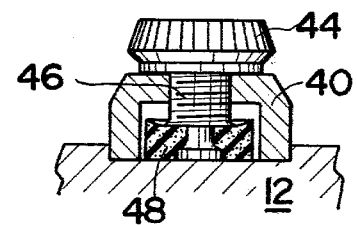

A load control knob 44 for the operation of second operating ring 40 has an integral screw portion 46 which engages the female screw portion of second operating ring 40, screw portion 46 having a friction member 48 made of rubber or the like affixed to the tip thereof as shown in FIG. 4. Thus, when friction member 48 is retracted from the surface of fixed barrel 12, as shown in FIG. 4, second operating ring 40 is lightly rotatable about the optical axis. Therefore, when operating ring 16 is moved back and forth, cam ring 30 may be smoothly rotated for zooming. Rotating second operating ring 40 also permits similar smooth zooming. When control knob 44 is rotated to thread screw portion 46 in place so that friction member 48 is pressed against the surface of fixed barrel 12, as shown in FIG. 5, the rotating load of second operating ring 40 increases due to a friction force. As a result, the movement of operating ring 16 along the optical axis makes it difficult to rotate cam ring 30. However, when an operating force is applied directly to second operating ring 40, the aforedescribed friction permits second operating ring 40 to be rotated by its operation. That is, if a friction force is thus acting, operating ring 16 cannot be accidentally moved straightforward, thereby making zooming possible through a rotating operation alone. Therefore, separate operating members 16 and 40 are used for focusing and zooming, respectively, whereby mutual effects can be eliminated. In greater detail, zooming alone is possible while a focusing condition is maintained, for example, or vice versa.

Figure 6:
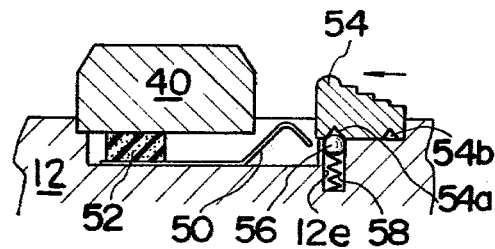
FIG. 6 is a cross-sectional view of another load control section of rotational zoom operation.

FIG. 6 shows another embodiment of an operation load control device, in which a friction member 52 made of rubber or the like is disposed between the bottom surface of second operating ring 40 and plate spring 50, and a load control knob 54 is provided for sliding movement along the optical axis at the rear of second operating ring 40. A recess 12e in barrel 12 is provided for the reception of a click ball 56 and a coil spring 58 biasing the ball outwardly of the recess for engagement with notches 54a and 54b located on the bottom surface of load control knob 54.

Many modifications and variations of the present invention are made possible in the light of the above teachings.

For example, the lens system is not limited to a two component zoom lens but may include a four component type comprising a first lens group for focusing, a second lens group for magnification variation (i.e., a variator), a third lens group for compensation (i.e., a compensator) and a fourth fixed lens group (i.e., a master lens group), a three component type comprising three lens groups with a front group moved for focusing and zooming, an intermediate group fixed and a rear group moved for zooming, or any other type of zoom lens system. Therefore, lens groups moved by a first operating member or moved through an intermediate member are not necessarily limited to one lens group, and the latter may comprise two lens groups, for example, moving at different speeds.

In the embodiment of FIG. 1, an index may be marked on the top surface of operating piece 38, and a zoom scale in relation to the index may be provided on fixed barrel 12 for zoom indication, while a set camera-to-subject distance may be indicated, in a similar manner to the embodiment of FIG. 3, by means of operating ring 16 and fixed barrel 12, with a scale ring and its related mechanism being omitted.

In the embodiment of FIG. 3, the rear end edge 16c of operating ring 16 may be formed into a cam so that it may offset the length by which operating ring 16 is moved along the optical axis by a helicoid when operating ring 16 is rotated for focusing, and a zoom scale like a focal length may be provided on fixed barrel 12, for zoom indication by the rear end edge 16c of operating ring 16 and the zoom scale. This makes a similar indicating mechanism in the embodiment of FIG. 1 possible by omitting scale ring 28.

Second operating ring 40 of FIG. 3 need not be engaged with fixed barrel 12 for relative rotation, but may be fixed to a plurality of pins carried on cam ring 30 projecting through circumferential groove 12d thereby being floated from fixed barrel 12. This may decrease the rotating load of cam ring 30.

A load control device for the second operating member may provide a controllable friction means between cam ring 30 and fixed barrel 12.

The lens in the embodiment of the present invention is of an exchangeable lens type, but may be fixed to the camera body.

In the aforedescribed embodiments, operating ring 16 is used for both zooming and focusing. However, operating ring 16 is used exclusively for a straightforward zoom operation, and in the case of a two component zoom lens system, an operating member may be coupled to a member, which in turn is coupled through helicoid threads to operating ring 16 or to a member provided integrally therewith, and disposed to hold a first movable lens. In the case of a four component zoom lens system, an operating member independent of operating ring 16 and capable of operating a first movable lens group for axial movement may be provided for focusing so that zooming and focusing are performed by separate operating members. In this case, a first operating member similar to operating ring 16 and a following member similar to straightforward frame 22 may be integrally coupled to each other or formed.

It is therefore to be understood that within the scope of the appended claims, the invention may be practiced otherwise than as specifically described.

From the foregoing, it can be seen that a dual directional zoom operation for a straightforward movement and a rotation can be alternatively selected with one zoom lens barrel. Its selection can be made by operating either of two operating members without any change-over operation. Compared to a construction which permits a specific type of operation, a second operating member alone may be added for use in rotational zoom operation, resulting in increase of the minimum number of parts.

Furthermore, if a load control means for a rotational zoom operating member is provided, straightforward zoom operation may be restricted. It should be noted that straightforward zooming and rotating focusing done by a first operating member may make both operations quick and prompt.

What is claimed is:

1. A lens barrel for a zoom lens system which includes at least first and second lens groups and wherein zooming is effected by the movement of said first and second lens groups with a given spatial relationship therebetween, said lens barrel comprising:

a stationary barrel;

a first operable member supporting said first lens group and being mounted on said stationary barrel for at least axial movement relative thereto so as to effect corresponding movement of said first lens group;

an axially movable follower;

means interconnecting said first operable member and said follower with one another such that movement of said first operable member or said follower effects corresponding movement of the other;

an intermediate member mounted for rotation about the optical axis of said lens system;

means comprising a first slot in one of said intermediate member and said follower and a first pin on the other of said intermediate member and said follower engaged with said first slot for interconnecting said follower and said intermediate member together, said first slot having a configuration which causes said intermediate member to rotate in response to axial movement of said follower and which causes said follower to axially move in response to rotation of said intermediate member;

a second operable member mounted on said intermediate member for rotation therewith;

a lens holder for supporting said second lens group; and means comprising a second slot in one of said lens holder and said intermediate member and a second pin on the other of said lens holder and said intermediate member engaged with said second slot for interconnecting said intermediate member with said lens support, said second slot having a configuration which causes said second lens group to move in response to rotation of said intermediate member with said given spatial relationship with respect to said first lens group.

2. The lens barrel according to claim 1, wherein said configuration of said first slot is such that pressure angles of said first slot and first pin engagement, when said intermediate member is rotated in response to axial movement of said follower and when said follower is axially moved in response to rotation of said intermediate member, are not greater than 50°.

3. The lens barrel according to claim 2, wherein said intermediate member comprises a cylinder supported on said stationary barrel.

4. The lens barrel according to claim 3, further comprising means on said stationary barrel for restricting movement of said follower such that said follower is prevented from rotation about the optical axis of said zoom lens system and free only for axial movement.

5. The lens barrel according to claim 4, further comprising manually operable means for adjusting load against rotation of said intermediate member.

6. The lens barrel according to claim 5, wherein said means for adjusting load includes a member for changing frictional engagement between said intermediate member and said stationary barrel.

7. The lens barrel according to claim 5, wherein said means for adjusting load includes a member provided on said second operable member for changing frictional engagement between said second operating member and said stationary barrel.

8. The lens barrel according to claims 1, 2 or 3, wherein one of said second operating member and said stationary barrel includes a focal length or zoom ratio scale and the other includes an index cooperable with said scale.

9. The lens barrel according to claim 4, wherein said means interconnecting said first operating member and said follower include threads engaged with each other, and said first operating member being rotatable about the optical axis of said zoom lens system as well as being axially movable, whereby said threads serve to axially move said first operating member as said first operating member is rotated.

10. The lens barrel according to claims 1, 2 or 3, wherein said second operating member comprises a ring rotatable along the outer periphery of said stationary barrel.

11. The lens barrel according to claims 1, 2 or 3, wherein said second operating member comprises a knob releasably attached to said intermediate member.

* * * * *